United States Patent [19]

Ramsay et al.

[11] Patent Number: 5,321,681
[45] Date of Patent: Jun. 14, 1994

[54] APPARATUS FOR RECORDING, STORING AND ELECTRONICALLY ACCESSING IMAGES

[75] Inventors: Eugene B. Ramsay, Stillwater; Thomas E. Ramsay, Minneapolis, both of Minn.; James E. Swendsen, Bellevue, Wash.

[73] Assignee: Image Premastering Services, Ltd., St. Paul, Minn.

[21] Appl. No.: 616,416

[22] Filed: Nov. 21, 1990

[51] Int. Cl.⁵ .................. G11B 31/00; G03B 27/52
[52] U.S. Cl. ............................ 369/69; 335/40; 335/55
[58] Field of Search .............. 369/100, 110, 69, 101, 369/103; 355/40, 42, 36, 44, 45, 77, 64, 55, 38, 52, 53, 32; 359/22-33

[56] References Cited

U.S. PATENT DOCUMENTS

| | | | |
|---|---|---|---|
| 3,249,691 | 10/1963 | Bigelow | 358/83 |
| 3,796,484 | 3/1974 | Forster, Jr. | 363/25 |
| 3,801,201 | 4/1974 | Greenblatt | 355/77 X |
| 3,813,685 | 5/1974 | St. John | 359/30 |
| 4,104,489 | 8/1987 | Satoh et al. | 359/29 |
| 4,155,630 | 5/1979 | Ih | 359/24 |
| 4,523,839 | 7/1985 | Payrhammer et al. | 355/77 |
| 4,623,245 | 9/1986 | Yu | 355/77 |
| 4,676,628 | 7/1987 | Asbury, III | 355/77 |
| 4,702,593 | 10/1987 | Detsch | 355/77 |
| 4,757,374 | 7/1988 | Ramsay | 355/40 |
| 4,922,290 | 5/1990 | Yoshitake et al. | 355/53 |
| 4,949,389 | 8/1990 | Allebaeh et al. | 359/29 |
| 4,965,630 | 10/1990 | Kato et al. | 355/52 |

Primary Examiner—Andrew L. Sniezek
Assistant Examiner—Thang V. Tran
Attorney, Agent, or Firm—Moore & Hansen

[57] ABSTRACT

Optical apparatus incorporating a lighting source capable of providing a substantial equal irradiance at each point of an image plane for use in backlighting transparencies during their reproduction and recordation. There is also disclosed and claimed apparatus using the lighting source to produce for the first time high quality electronic images in an analogue format of medical imagery originally or subsequently produced in a tangible form such as X-ray, CT, or MR images. There is further disclosed an integrated system providing apparatus for converting, storing, and retrieving images originally produced in tangible or intangible form that are subsequently converted to an analogue electronic format and stored in analogue format on an optical disc in an optical disc library. The system includes the apparatus for converting the tangible images into high quality electronic images and for converting digital images produced during CT or MR imaging or the like into a common analogue medium.

32 Claims, 6 Drawing Sheets

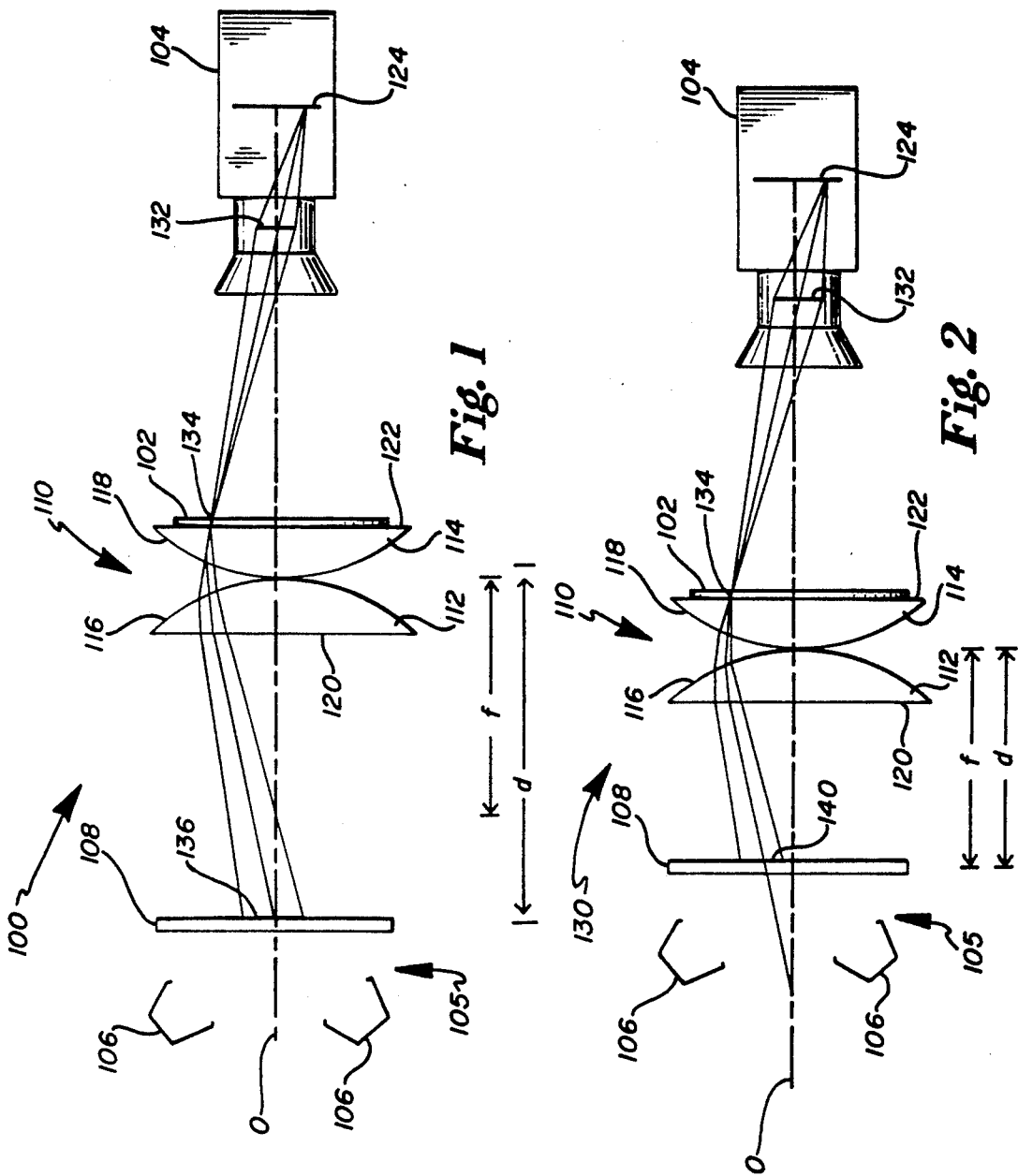

APPARATUS FOR RECORDING, STORING AND ELECTRONICALLY ACCESSING IMAGES

BACKGROUND OF THE PRESENT INVENTION

The present invention relates to apparatus for producing substantially equal irradiance at each point of a pre-selected area; to apparatus for converting visual data contained in transparencies or other visual media into electronic media; and to a system for integrating records contained in various media into a single useable media.

The modern medical practitioner has been blessed with a variety of new equipment capable of producing medical information in a variety of media. For example, computed tomography (CT) and magnetic resonance imaging (MRI) technologies produce information about the human body in a digital form that may later be displayed on a monitor or produced in a tangible form such as a negative for the treating physician to observe and to evaluate. With ultrasound imaging technology, the practitioner is able to view either a single snap shot taken at an instant in time or a movie produced from a series of such snap shots. With traditional X-ray equipment, the practitioner is provided with a view of the human body in the form of a negative, which can be observed and evaluated when the X-ray is displayed on a radiologist's lightbox. These are but some of the examples of the presently available devices that produce visual images for the medical practitioner to view and evaluate. Angiography, positron emission tomography (PET) scanning, and mammography are other examples.

While these devices produce vital medical imagery, they do so in a variety of different media. As noted above, the traditional X-ray is produced on a photographic negative. Most often, CT and MRI imagery are produced and stored as electronic media, although negative transparencies are also often produced from the electronic data. Images produced by ultrasound may be printed onto paper or may be captured in the form of a movie on videotape.

This broad variety of image storage media creates several problems. First, storage problems are presented for the institution where the information is gathered. Second, with the new imaging technologies, large numbers of images are created whereas in the past, perhaps only two or three X-rays would need to be accounted for by the record storage system. Third, the transfer of information in the form of the original images among medical personnel is hindered. Fourth, societal costs of the ill patient are increased. Examples of each of these problems may be readily given. Thus, X-ray negatives consume a considerable amount of often limited, expensive hospital floor space for storage of this form of tangible medical imagery. Other tangible imagery similarly use up large volumes of storage space. At large hospitals where thousands of these images are produced in short periods of time, filing of the images in the storage area so they can be found again may itself be a problem. Additionally, since other hard or paper copies of electronically produced imagery such as CT, ultrasound or the like are produced for viewing, the large numbers of images produced by these technologies exacerbates the storage problem.

Data transfer problems are increasing due to the ever-increasing specialization in the medical field. Medical records are being transferred from location to location both within and without a medical facility, with greater frequency.

Examples of data transfer problems include time delays inherent in the movement of tangible information from one location to another. Obviously these delays themselves slow communication between medical personnel. They also ma be additionally wasteful of time because they may keep busy a physician waiting for the information. The delays also may create a danger for a patient in need of rapid evaluation by an expert not present where the information is produced. Tangible media do not present the only communication problem, however. Information stored in electronic formats also presents problems because, presently, each manufacturer of CT, MRI, or other such imaging apparatus utilizes different electronic formats to acquire and store the data. Thus, even the data produced by these disparate techniques can present difficulties in providing a single storage system for electronically gathered technology; and because of that difficulty, utilization of the data after its acquisition can be difficult at any place other than the originating location.

Unnecessary, perhaps excessive, costs arise directly from the present system of medical record storage. For example, a patient may be retained in a hospital until a consulting physician, who may be an expert in a particular field, examines the particular medical imagery involved. Where the image media is an X-ray negative, the patient may be retained needlessly overnight while the X-ray is shipped to the consulting physician in a neighboring hospital, city or state or completely across the country. Not only may there be increased costs associated with retaining the patient in the hospital, but there are costs associated with the transfer of the important medical data in its tangible form such as postage expenses, handling costs, and reproduction costs if the medical images is copied and the copy sent rather than the original. Finally, a danger always exists that a vitally important medical image may be lost or misplaced during such shipments or storage.

Attempts have been made to deal with these problems. Thus, there exists apparatus capable of storing imagery produced in a digital format. Such systems do not well incorporate imagery that is produced in a non-electronic format in the first instance, such as X-rays, however. This stems from the fact that electronic reproductions of X-rays and the like have not been of a high enough quality for the evaluating physician to rely upon them. This inability to qualitatively reproduce the X-rays stems from an inability of present light sources to provide the proper backlighting to record the image on the transparency. The backlighting must, to provide a faithful, high quality reproduction, substantially equally irradiate each point of the transparency so that the data contained therein can be duly recorded. When too much light passes through one point relative to another, the information of the first point may be over emphasized and the information of the second point may be de-emphasized or lost entirely in the glare of the light passing through first point. Where the points form part of an X-ray, critical data important to a proper evaluation may be lost. Treating physicians are reluctant to rely on images for evaluation purposes when the image may have lost valuable or critical information in its reproduction from the original. Thus, equal irradiance is critical to high quality recording of X-rays, but not possible with present devices.

The above referred to systems rely upon digital transmission and replication of an image on a computer monitor, which is slow, however. Analogue transmission of the image would be faster; the technology in the medical area has shown a decisive digital trend, however, due, no doubt to the initial production of the electronic images in a digital format. Furthermore, because of its slowness, the digital systems provide little archiving capability to a medical institution. Because of these limitations, the digital systems presently available also provide limited education or training functions. This itself is critical in that many of the digital technologies are of a recent vintage and older practitioners are in need of training in the proper use of the data made available by digital imaging. Additionally, present day systems cannot provide true color displays of the data, which can aid in proper evaluation procedures, nor do they provide full motion. That is, with ultrasound and the like, motion studies are possible but since the present digital systems can take up to ninety seconds to transmit a single image from storage to a workstation, motion studies are essentially impossible to do.

This type of digital system is very expensive also, with costs often over one million dollars because of all of the necessary digital processing equipment. Analogue systems are quite inexpensive by comparison. Additional costs include the paper copies often produced of the digital images.

Another problem with the current image storage system is that there exists no single location where all of a patients records are stored. That is, X-rays may be in one location, an MR image may be in another, and the doctor's notes in still another. Gathering all of the records together is a tedious, time consuming task that could be improved if all of the images were stored in one location such as an electronic library. Storage of all records in a common medium including physician's notes, would completely eliminate this problem.

Thus, it has not been possible to design a single system capable of handling all medical imagery produced by the various apparatus now available. It would be desirable, therefore, to be able to convert tangible medical images originally in negative or positive views to an analogue electronic format and combined with digitally produced images such as that produced by CT, PET, MRI and the like devices in a common analogue format in a high density storage library such as that provided by optical disc technology at a reduced cost.

SUMMARY OF THE PRESENT INVENTION

It is a principle object of the present invention to provide new and improved apparatus that is not subject to the foregoing disadvantages.

It is another object of the present invention to provide a system for converting data stored in a plurality of different media into a single common media capable of distribution to a plurality of remote workstations.

It is yet another object of the present invention to provide apparatus for converting visual data in a tangible medium into a common electronic medium.

It is still another object of the present invention to provide a light source useful in the conversion of visual data contained in a tangible medium into an electronic medium.

The foregoing objects of the present invention are achieved by providing apparatus for converting visual data found in a plurality of media into a single, common medium for transmission to and display at a plurality of local and remote workstations.

In a medical environment, the apparatus will provide high quality reproduction of X-rays that may be stored on an optical disc for later retrieval and review. This apparatus may be incorporated into a unique system that facilitates storage of patient records produced in differing media by X-ray, MRI, CT or the like in a common format on optical disc and reproduction of the images at a workstation remote from the image generating equipment, whether it is located in the room where the image is produced or across the country in a specialist's office.

The foundation of the apparatus of the present invention is a unique light source capable of producing substantially equal irradiance at each point on an image plane that may be as large as a standard X-ray negative, that is, 14 inches by 17 inches. The apparatus comprises a plurality of light generating sources strategically arranged to equalize as nearly as possible the light emanating from the array. A diffuser is used to further equalize the light, and when properly placed in relation to a condensing lens system, acts as the light source for the condenser. The diffuser is preferably spaced no closer to the condenser than the back focal point thereof. The condenser comprises a pair of aspheric plano-convex lenses that gathers the light passing through the diffuser and focuses it. Placement of the diffuser relative to the condenser as described further achieves an averaging of the irradiance at each point in a plane drawn parallel to the planar surface of the lenses, that is, transverse to the optical axis, such that the irradiance is substantially equal at each point of the plane. With this light source, high quality electronic reproduction of large photographic negatives, such as medical X-rays, is achievable for the first time.

Apparatus in accordance with the present invention useful in providing high quality reproduction of large negatives includes the light source just described, means for disposing a transparency such as an X-ray negative at an image plane as near to the light-exiting side of the condenser as possible, an image recorder to record the image on the transparency and an optical disc information storage and retrieval system to store the recorded image for later retrieval and evaluation.

The foregoing objects of the invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIG. 1 shows in a schematic side elevation view, a light source in accordance with the present invention wherein a diffuser is spaced from a condenser a distance greater than the focal length of the condenser;

FIG. 2 shows in a schematic side elevation view the light source of FIG. 1 wherein the diffuser is positioned at the focal point of the condenser;

DETAILED DESCRIPTION OF THE PREFERRED EMBODIMENT

Figure 3:
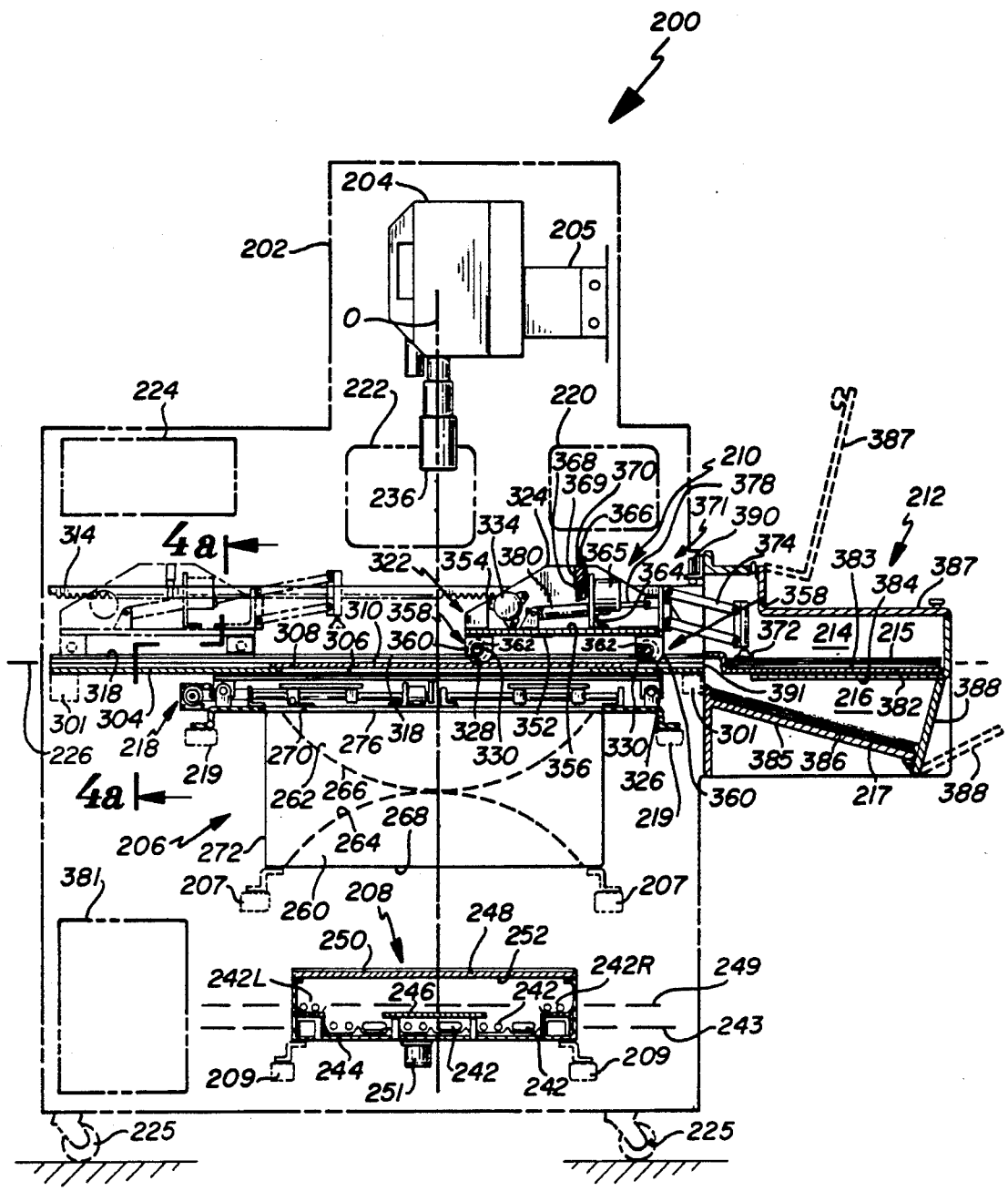
FIG. 3 illustrates in a side elevation, partial cross-sectional view an automated image conversion apparatus in accordance with the present invention useful in producing high quality analogue electronic images from visual data originally and primarily in the format of a photographic negative.

FIG. 1 illustrates an illumination system 100 having an optical axis O. System 100 provides a substantially equal illumination at each point of a preselected area, here represented by a transparency 102, thereby allowing an image recorder such as camera 104 to record a high quality reproduction of the image original provided by transparency 102. System 100 comprises a light box 105 that includes a plurality of light generators 106. The generators 106 illuminate diffuser 108, whose surface is disposed transversely to optical axis 0. Light from generators 106 passes through diffuser 108 and is gathered and focused by a condenser 110 comprising a first aspheric, plano-convex lens 112 and a second aspheric, plano-convex lens 114. Lenses 112 and 114 are so arranged that their convex sides 116 and 118, respectively, face each other, with the planar side 120 of lens 112 serving as the entrance side of condenser 110 for light from light box 105 and the planar side 122 of second lens 114 serving as the exit side of condenser 110. Light passing through condenser 110 is focused by the condenser onto a recording plane 124 of image recorder 104.

Light box 105 is positioned relative to condenser 110 such that diffuser 108 is spaced from planar surface 120 of lens 116. That is, diffuser 108 should be placed no closer than the focal point to condenser 110. In system 100, diffuser 108 is spaced a distance d away from condenser 110 greater than the focal length f of the condenser lens system. Moving diffuser 108 away from planar surface 120 increases the averaging of the illumination across transparency 102. A penalty is paid by increasing the distance, however, in that the total illumination is decreased and the size of any optical system using illumination system 100 is increased.

FIG. 2 illustrates an illumination system utilizing the same components as system 100 but wherein diffuser 10 is positioned relative to condenser 110 such that diffuser 108 is positioned at the focal point of condenser 110. In all other respects, the relative placement of the various components is the same between FIGS. 1 and 2.

In constructing a system such as system 100 or system 130, camera 104 must first be placed relative to transparency 102 so as to be able to photograph the desired areas of the transparency without rotation of camera 104. That is, the optical axis of camera 104 and condenser 110 should be coincident. Transparency 102 in turn should be located as closely as possible to planar surface 122 of second lens 114 to take maximum advantage of the optical properties of condenser 110.

Once the relative positions of camera 104 and transparency 102 are established, the optimal positioning of diffuser 108 as well as the relative advantages and disadvantages of each system can be determined by tracing light ray through the system. In making this determination, all light rays except those entering the entrance pupil 132 of camera 104 will be ignored. Thus, picking a point 134 on the transparency and tracing the rays that enter the camera pupil 132 backwards, it can be seen that only a small area 136 of diffuser 108 contributes to the illumination of point 134. When diffuser 108 is spaced rearwardly from the focal point of condenser 110, the area 136 contributing to the illumination of point 134 on transparency 102 is centered on the optical axis O of illumination system 100 and has a configuration determined by the configuration of entrance pupil 132 of camera 104. Thus, where the entrance pupil is substantially circular as is the case with almost all known cameras, area 136 will also have a circular configuration. It can be shown that by using a system such as that shown in FIG. 1 that each point on transparency 102 will be illuminated by substantially the same area 136 of diffuser 108. Thus, only a small portion of diffuser 108 is necessary to provide the illumination across the entire transparency 102 with the system as shown. Furthermore, since each point on transparency 102 is illuminated by the same area 136 on diffuser 108, the averaging of the irradiance passing through each point of transparency 102 becomes optimal. As noted, penalties are paid with such a configuration in that since light intensity is inversely related to the distance from the light source, the further removed diffuser 108 is from transparency 102, the greater output that light generators 106 must have. Furthermore, this also enlarges any potential optical system and may not be practical for certain applications, though most desirable from a light management standpoint.

A practical alternative is shown in FIG. 2 wherein diffuser 108 is placed at the focal point of condenser 110. In such a system, a small surface area 140 again contributes to the illumination of point 134. This area, however, is located off the optical axis. As such, distinct, substantially similarly configured areas of diffuser 108 are used to illuminate each point of transparency 102. Where a substantially equal illumination is emitted by diffuser 108, this is not a problem however. Where diffuser 108 provides a substantial equal illumination across its face, the configuration shown in FIG. 2 may be used with equal facility of that shown in FIG. 1. Nevertheless, where the intensity emitted by diffuser 108 is not substantially equal on its face, the configuration of FIG. 1 is preferable in that only a small area and the same area of diffuser 108 contributes to the illumination of each point 134 of transparency 102. Again it should be noted that light from other portions of diffuser 108 also illuminate point 134 of transparency 102 but that those light rays are not captured by the entrance pupil 132 of camera 104 and thus ar not relevant to the consideration of achieving substantially equal illumination at each point of the transparency. With the configurations shown in FIGS. 1 and 2, there will be no significant variation of the irradiance of each point of transparency 102 reaching entrance pupil 132 of camera 104. That is the critical factor in achieving high quality image recording.

The optical configuration shown in FIGS. 1 and 2 enables high quality reproduction of images captured on transparencies, such as X-ray negative, photographic negatives, slides, film, microfiche, or the like to be made. Prior art devices fail to achieve a sufficiently equal illumination across the surface of the transparency, thus losing important information in their image reproduction. As such, in many applications, particularly those in the medical field, doctors were reluctant to rely on a reproduced image for fear that an important detail may be lost in the reproduction. With the illumination system shown in either FIG. 1 or 2, a high fidelity reproduction of an image originally in a tangible form, such as a medical X-ray, computer tomography image, magnetic resonance image or the like, can be made. Apparatus for accomplishing this is shown in FIG. 3.

FIG. 3 illustrates an automated image conversion apparatus 200 that may be used to rapidly and faithfully reproduce images captured on transparencies such as X-ray negatives or aerial photographic negatives or the like. Apparatus 200 comprises a cabinet 202 shown in phantom outline for clarity that supports and contains the various components of apparatus 200. Apparatus 200 includes an image recorder 204 mounted by a mounting means such as a bracket 205 to cabinet 202, a condensing lens system 206 mounted within cabinet 202 by support means 207, and a lightbox 208 mounted by a support means 209 within cabinet 202, all of which are centered on a vertically oriented optical axis O. Apparatus 200 further includes a film pick-up 210 that picks up from a film feed and discharge box 212 an individual input transparency 215, that centers the area of interest of the transparency on the optical axis, and that discharges the transparency into a film output bin 216. Apparatus 200 also includes a masking mechanism 218 supported by means 219. Areas of the transparency that are not to be photographed may be masked by mechanism 218 to prevent light transmission therethrough. A monitor 220, shown in phantom, may be included to display what the image recorder 204 is recording. Operation of apparatus 200 may be controlled by a touch-control plasma display panel 222 shown in phantom that is connected by known means to the various elements of apparatus 200 through a computer 224 also shown in phantom. If desired, apparatus 200 may include roller means such as wheels 225 to facilitate movement of the apparatus to desired locations.

In order to fully understand apparatus 200, a brief description of its operation will be helpful. Thus, individual transparencies are loaded into film input bin 214 from which film pickup 210 may move them to an image plane 226 centered on the optical axis O for recording. Lightbox 208 and lens system 206 operate as a light source in the manner described in relation to FIGS. 1 and 2 to substantially evenly irradiate the film transparency as it lies on the image plane 226 of the apparatus. The image is then recorded by image recorder 204. If necessary, a particular area or image of interest that may itself not be centered on the center of the film transparency may be moved by the film pickup such that that area is centered on optical axis O. Examples of such transparencies include computed tomography negatives which commonly include a plurality of individual images on a single transparency negative. Movement of the transparency on the image plane 226 may be controlled by means of touch control panel 222 through computer 224. When all the desired images have been recorded from a single transparency, film pick-up 210 will be operated so as to remove the transparency from the image plane 226 and deposit it in discharge bin 216 of film feed and discharge box 212. The images recorded by image recorder 204 will be transferred by known means to an optical disc recorder (not shown) where they will be recorded for permanent storage on an optical disc. The recorded optical disc may then form part of an optical disc storage and retrieval library system. Having thus set forth the most general details of the operation of apparatus 200, it's individual components may now be more fully explained and more easily understood.

Lightbox 208 is supported within apparatus 200 by a support means 209. As shown in FIG. 3, lightbox 208 includes a plurality of elongate U shaped light generators 242 arranged side-by-side in a common plane 243 to form an array. Reflectors 244 may be used to redirect the light emitted from the bottom side of light generators 242, thus increasing the directional light output from lightbox 208. Light generators 242 are preferably non-incandescent bulbs that generate light by means of electrical stimulation of the electrons of the atoms of an inert gas to higher energy levels, the energy being released as light as the electrons decay back to their ground state.

Because such lights emit more light from the center portions thereof than the end portions, a first diffuser 246 located over the center portions of light generators 242 may be used to equalize the illumination emitted from lightbox 208. A second diffuser 248 is further used to even out the illumination emitted from the top surface of lightbox 208. Second diffuser 248 covers the entirety of the light generators 242.

As shown in FIG. 3, the light generators at the left and right side of the light box, 242L and 242R respectively, are spaced above the remaining centered light generators in a second plane 249. Thus, light generators 242L and 242R are disposed in a second common plane 249 spaced above a first common plane 243 wherein the remainder of light generators 242 are disposed. This arrangement further equalizes the illumination being emitted from lightbox 208 because whereas each of the centrally disposed light generators 242 has a light generator on each side thereof that contributes to the illumination, the end generators 242R and 242L have only one adjacent light generator located toward the center of lightbox 208. Thus to equalize the light such that there is not a drop off in intensity along the left and right edges thereof, light generators 242L and 242R are disposed upwardly with respect to the other generators so that they are closer to second diffuser 248. Since light intensity at a particular point is inversely related to the distance to the light source, placement of light generators 242L and 242R closer to diffuser 248 aids in eliminating the illumination disparity that would otherwise exist because there are not light generators on both sides of end generators 242L and 242R contributing to the light emitted from lightbox 208. In other words, the arrangement of light generators 242, and 242L and 242R, together with first diffuser 246 operates to initially equalize the light irradiance striking the bottom surface 252 of diffuser 248. The light exits lightbox 208 from the top surface 250 of diffuser 248. Top surface 250 acts essentially, then, as the light source for apparatus 200. Diffusers 246 and 248 are made of plexiglass though milkglass may also be used. Although the light generators of lightbox 208 generate light with substantially no heat production, a fan 251 may be used, if desired, to circulate air to ensure that the interior of cabinet 202 remains at approximately room temperature.

Lightbox 208 is spaced from lens holder 206 such that second diffuser 248 is located no closer than the focal point of condensing lens system 206. Condensing lens system 206, as seen in FIG. 3, comprises a pair of aspheric, plano-convex lenses 260 and 262 arranged so that their convex sides 264 and 266 respectively face each other and so that planar surface 268 of first or bottom lens 260 forms the entrance side of condenser 206 and planar surface 270 of second or top lens 262 forms the exit side of condenser 206. Lenses 260 and 262 are properly positioned by a lens support framework 272. Condensing lens system 206 is supported within apparatus 200 by a support means 207 such that system 206 is centered on optical axis O. As noted, system 206 preferably utilizes aspheric lenses to make more efficient use of the available light generated by lightbox 208. Spherical lenses, however, may be substituted for the aspheric doublet shown and described but at the penalty of a reduction in efficiency of the generator light utilized. A transparent sheet 276 forms the top surface of condenser 206.

Figure 4:
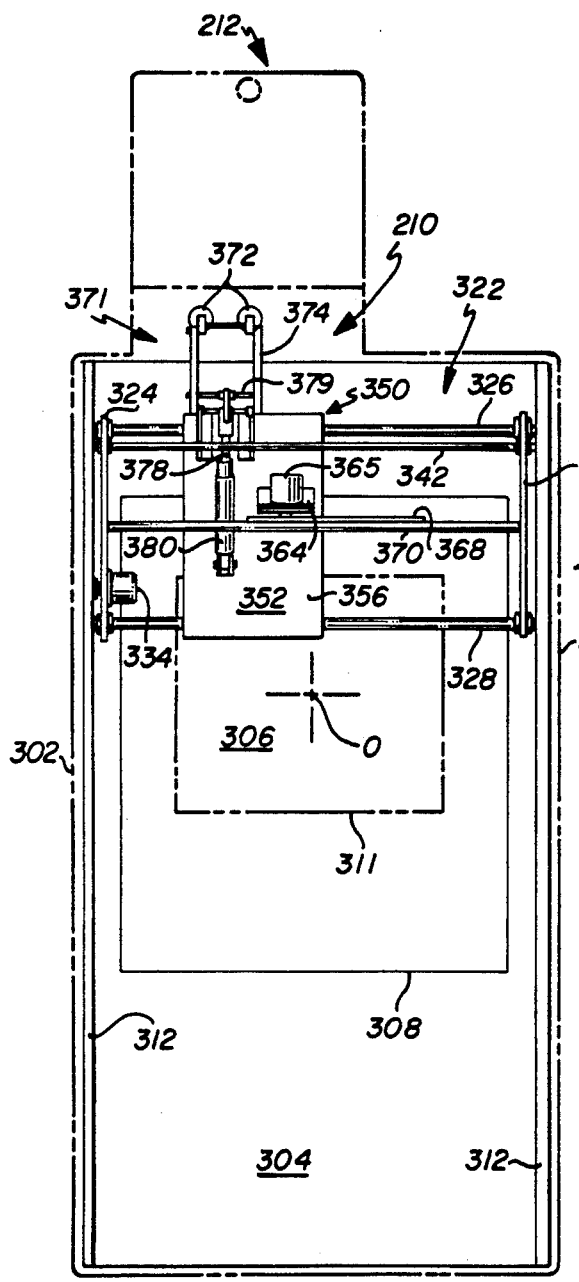
FIG. 4 illustrates in a top plan view the film pick-up apparatus of the image conversion apparatus shown in FIG. 3.
Figure 4A:
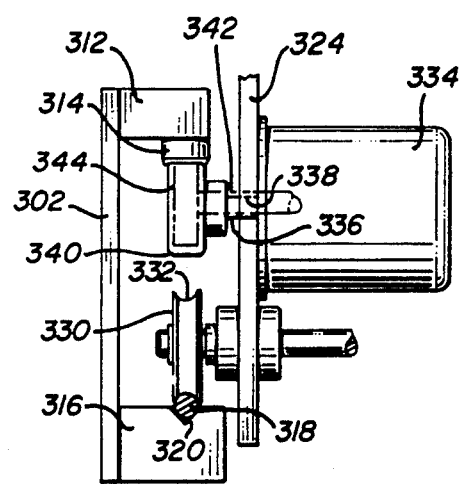
FIG. 4a illustrates the film pick-up apparatus in a cross sectional view taken along cutting plane 4a-4a of FIG. 4.

Referring now to FIGS. 3, 4, and 4a, film pickup mechanism 210 will be described. Film pickup 210 has an elongate configuration and includes a carriage support means 300 supported within cabinet 202 by support means 301. Carriage support means 300 comprises a pair of spaced apart side wall members 302 and a floor 304 extending therebetween to form an open ended box-like structure. Floor 304 has a rectangular plate-like configuration and has an imaging aperture 306 disposed therein. Aperture 306 is overlaid by a glass plate 308 having a top surface 310 on which the transparencies, such as transparency 311, rest when being imaged by image recorder 204. Thus, image plane 226 lies substantially co-planar with top surface 310. Imaging aperture 306 of floor 304 should be of sufficient dimensions such that the largest standard X-ray negative, $14 \times 17$ inches, can be fully illuminated.

Each side wall 302 has a longitudinally extending support member 312 rigidly affixed thereto. Each support member 312 in turn supports a rack 314. A lower support member 316 is rigidly affixed to both side wall 302 and floor 304. Lower support member 316 supports a substantially cylindrical, elongate rod 318 in a groove 320. Racks 314 and rods 318 support and facilitate the movement of a first carriage 322.

First carriage 322 comprises a pair of spaced apart, parallel side walls 324. The exact configuration of side walls 324 is not important except to the extent that they may be supported in all three dimensions. As shown in FIG. 3, the side walls have a somewhat triangular configuration wherein each of the corners has been truncated. The supports for the wall should form a triangular structure to provide a stable carriage structure. Front and rear support bars 326 and 328, which form two legs of the three in the support triangle, extend transversely between and through carriage side walls 324. Each side wall 324 includes apertures through which an end of either a front or a rear support bar extends. Each of the ends of the support bars rotatably mounts a roller 330. Each roller 330 includes a concave, semi-circular rim 332 configured to match that of rod 318. Thus, first carriage 322 rides on rods 318 by means of wheels 330.

First carriage 322 is propelled along rods 318 by a rack-and-pinion gear arrangement. Thus, a motor 334 is attached to the inner side of a side wall 324 and includes a drive shaft 336 extending through an aperture 338 in the side wall. A pinion gear 340 is fixedly attached to drive shaft 336 and drivingly engages the teeth of rack 314. Thus, rotation of pinion 340 by motor 334 will drive first carriage 322 forwardly or rearwardly along rods 318. To prevent first carriage 322 from canting during movement due to a single drive, additional rack-and-pinion engagements are provided. Thus, first carriage 322 includes a shaft 342 extending between and through carriage side walls 324. Shaft 342 mounts a pinion gear 344 at each end thereof, each of which engages a rack 314 on its respective side. The use of rack-and-pinions 314 and 340, 344 functions to keep the motion of first carriage 322 substantially parallel to each of the carriage side walls 324.

First carriage 322 mounts a second carriage 350, which is movable in a direction transverse to the motion of first carriage 322. Second carriage 350 includes a base member 352 that is slidably mounted to front and rear support bars 326 and 328, respectively. Base member 352 has a substantially rectangular configuration having bottom and top surfaces 354 and 356, respectively. Bottom surface 354 has a front pair and a rear pair of mounting means 358 rigidly attached thereto. Means 358 each includes a depending member 360 having a bearing aperture 362 through which either support bar 326 or 328 extends. Aperture 362 is preferably a low friction sleeve to ease the sliding motion of second carriage 350 thereon.

Second carriage 350 is moved transversely to the direction of motion of first carriage 322 by means of a rack and pinion gear arrangement driven by a motor. Thus second carriage 350 mounts on its top surface 356 a motor support 364 that in turn carries a motor 365. The drive shaft 366 of motor 365 is attached to a pinion 367 in driving engagement with a rack 368 carried by the bottom surface 369 of an overhead support 370 that extends between carriage side walls 324. Support 370 forms the third leg of the afore mentioned triangular support structure.

Top surface 356 of base member 352 supports a vacuum pickup mechanism 371 useful in the movement of a variety of different sized transparencies. Vacuum mechanism 371 includes a plurality of suction cups 372 attached at the end of a parallelogram linkage 374 so as to be substantially horizontally oriented. Suction cups 372 may be raised and lowered by the extension and retraction of a piston 378 forming part of a cylinder 380, which is preferably activated by pneumatic means. Piston 378 is attached to a member 379 extending between the two sides of the parallelogram linkage 374. Thus, activating cylinder 380 such that piston 378 is extended causes linkage 374 to lower, resulting in the lowering of suction cups 372. Similarly, retraction of piston 378 will raise parallelogram linkage 374, thereby causing suction cups 372 to be moved upwardly.

Suction cups 372 are connected to a vacuum pump 381 by known means. When cups 372 are lowered onto a transparency and the vacuum applied, the transparency will be held in place by the differential air pressure in a well known manner. When so held, the transparency will be movable by the film pickup from input bin 214 onto glass plate 308 and from there to output bin 216.

Thus, with the film pickup 210 just described, a transparency may be picked up and moved to a desired location on glass plate 308, a first area of interest may be recorded by image recorder 204, and then the transparency may be moved forwards, backwards, and sideways to place the center of another area of interest on the transparency on the optical axis. In this manner, a variety of individual images may be recorded from a single transparency if desired and certain images may be left unrecorded if so desired.

Film feed and discharge box 212 is shown in FIG. 3. As noted, box 212 includes a film input bin 214 that holds input transparencies 215 and a film output bin 216 that holds output transparencies 217 separated by a wall structure 382. Transparencies may be laid into input bin 214 such that they rest upon the top surface 383 of wall structure 382. Preferably, wall structure 382 and thus, film box 212 is disposed relative to image plane 226 of apparatus 200 such that the bottom surface 384 of wall structure 382 is reposed slightly below image plane 226. Film output bin 216 includes a slanted member 385 that provides a top surface 386 upon which transparencies will be disposed when imaging thereof is concluded.

Film box 212 further includes an upper lid 387 and a lower lid 388 by means of which transparencies may be loaded into input bin 214 and removed from output bin 216 respectively. Both lids 387 and 388 are shown in their closed position in FIG. 1 in bold print, and their open position in phantom. Film box 212 further includes a plurality of infrared sensors 390, only one of which is shown in the Figure. Preferably, the sensors 390 are spaced along one side of film box 212. These sensors operate in a well known manner to measure the size of the particular transparency being imaged including its length as well as its width. Sensors 390 are connected by means of known communication means to computer 224. Thus, as film pick-up 212 removes a transparency from input bin 214 it's size is recorded by computer 224. It is incumbent that the control system as represented by computer 224 and touch display panel 222 know the size of the transparency being imaged so that film pick-up 210 may properly maneuver it in response to commands by computer 224. Sensors 390, then, enable transparencies of varying sizes, from 7 inches by 7 inches to 14 by 17 inches, to be reproduced and recorded by apparatus 200.

Figure 6A:
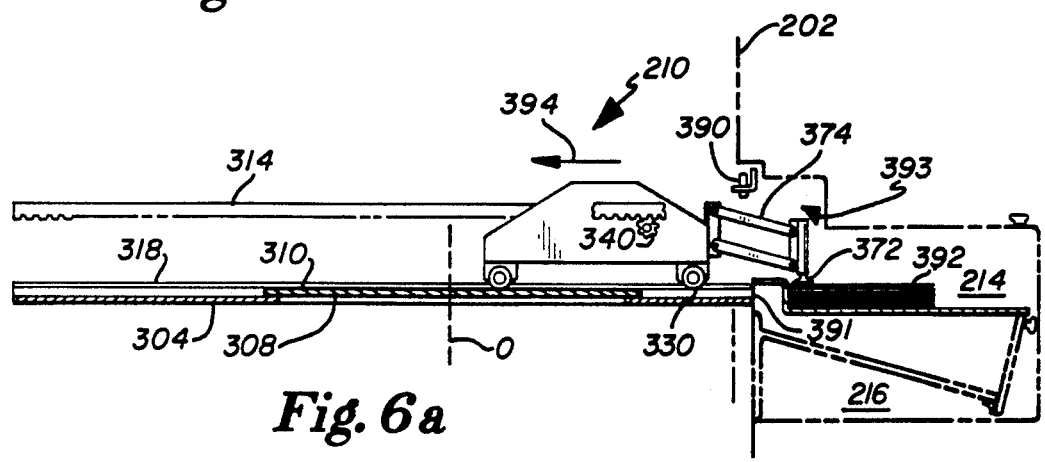
FIGS. 6a, 6b, and 6c illustrate in side elevation schematic views the operation of the film pick-up apparatus during pick-up of a transparency from the input bin, recording of the transparency, and discharge of the transparency into the discharge bin of the film box.
Figure 6B:
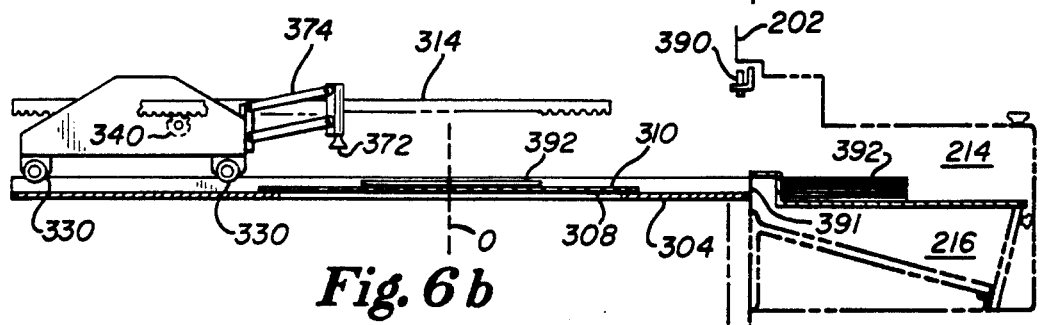
Figure 6C:
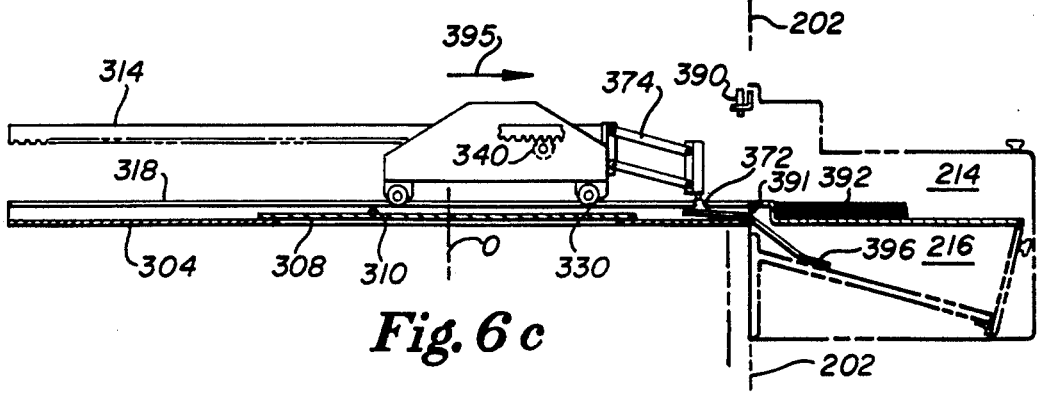

The operation of the film pick-up is shown in FIGS. 6a, 6b, and 6c. FIG. 6a shows the suction cups 372 of film pick-up 210 lowered onto a transparency 392 lying within bin 214 by the pivotal action of parallelogram linkage 374 in response to the extension of piston 378. A vacuum will be applied and the transparency will be held in place against the suction cups by atmospheric pressure. Suction cups 372 will then be raised as indicated by arrow 393 by reverse action of parallelogram linkage 374 until they are substantially horizontal. First carriage 322 will move inwardly into cabinet 202 as indicated by arrow 394 pulling the transparency therewith. As the transparency is pulled into carriage support means 300, it will pass by sensors 390, which will sense the interruption of the infrared light beams and provide representative signals thereof to computer 224 to indicate the size of the transparency. When film pickup 210 has properly positioned the transparency onto the top surface 310 of glass plate 308, the vacuum will be released, the suction cups 372 will be raised, and, if not already out of the view of image recorder 204, pick-up 210 will be moved out of the viewing area substantially to the position shown in FIG. 6b and in phantom in FIG. 2. As noted previously, images of the transparency will then be recorded and the transparency will be discharged.

In the discharge sequence shown in FIG. 6c, the transparency will again be picked up by the suction cups 372 and first carriage 322 will move toward the film discharge box as indicated by arrow 395. The transparency will slide along glass plate 308 until it reaches an opening 391 into discharge bin 216. Opening 391 will be substantially in-line with the top surface 310 of glass plate 308. Thus, as the transparency is slid towards the discharge bin, the free end 396 thereof will enter opening 391 and being to droop downward under the influence of gravity. Film pickup 210 will continue to push the transparency into the discharge bin until at least half of the transparency has been pushed therein. The vacuum will be released from suction cups 372 and the transparency will slide under its own weight completely into discharge bin 216. Computer 224 may be programmed to maneuver film pick-up 210 to a single location suitable for release of all sizes of transparencies or to multiple locations based upon the measured size of the transparency. After release of the transparency, film pick-up 210 will be moved towards film box 212 until first carriage 322 is again in position to lower suction cup 372 onto another transparency for a pickup.

Figure 5:
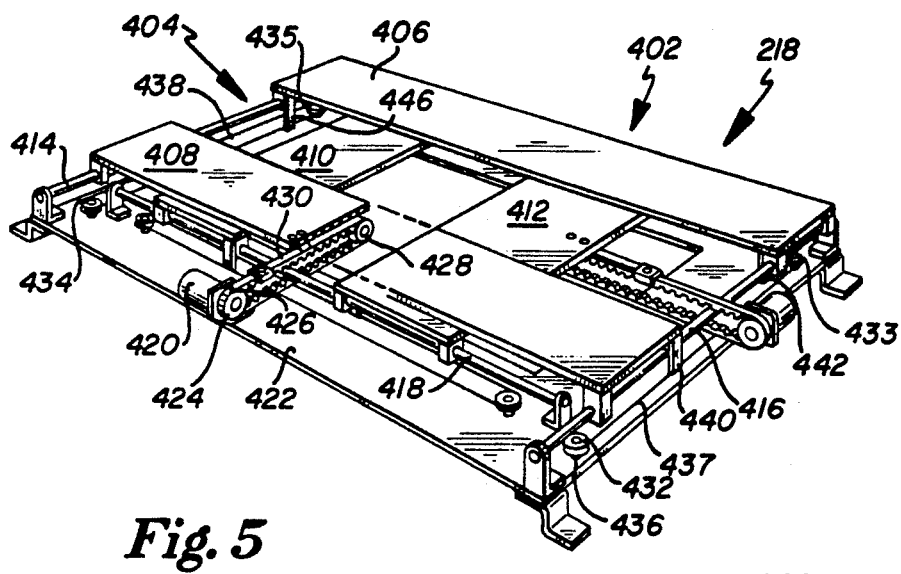
FIG. 5 shows in a perspective view the masking mechanism of the automated image conversion apparatus shown in FIG. 3.

Another desirable feature of the present invention is masker 218. Masker 218 functions to prevent excess light from reaching the optics of image recorder 204. Because certain transparencies are not opaque in regions of disinterest and may in fact be completely transparent, light from light box 105 will pass directly through the transparency with no attenuation and will be directly focused into recorder 204 unless blocked. This "excess light" may, and in many cases will, obscure the contrast in regions of interest on the transparency. In brief and referring to FIGS. 3 and 5, masker 218 performs this function by including first and second pairs of shutters 402 and 404 movable in transverse directions to define a rectangular area through which light may pass to reach image recorder 204. Thus, masker 218 may be used to outline an area of interest on the transparency to be recorded, thereby substantially blocking all other light from light box 208 from entering the entrance pupil 236 of image recorder 204.

Masker 218, as noted, comprises first and second shutter pairs 402 and 404, respectively. Pairs 402 and 404, in turn, include oppositely movable shutter members 406, 408, and 410, 412, respectively. Shutter members 406 and 408 are slidably mounted at one end thereof on a rail 414 and at the other end on rail 416.

Shutter members 410 and 412 are slidably mounted at one end thereof on a rail 418 and at the other end on another rail (not shown). Because movement of each pair of shutters is substantially similar, only the mechanism for moving shutter pair 406 and 408 will be described.

Thus, a motor 420 is affixed to a frame 422 that supports the rails 414, 416, 418, and another rail (not shown). Motor 420 has a pulley 424 attached for rotation thereto. A timing belt 426 extends between pulley 424 and a pulley 428 that is rotatably supported by frame 422. An arm 430 is affixed to shutter 408 and to timing belt 426 such that when timing belt 426 is rotated by the activation of motor 420, shutter member 408 will accordingly be moved in the direction of movement of the upper portion of belt 426. Thus if motor 420 is rotating pulley 424 such that the upper portion of timing belt 426 is moving towards member 406, shutter member 408 will be moved in that direction also. Conversely, if motor 420 is reversed such that the upper portion of timing belt 426 is moved towards the outer edge of masker 218, shutter member 408 will be moved away from member 406. Obviously, when shutter members 406 and 408 are moved towards each other, the aperture therebetween becomes smaller and when they are moved apart from each other, the aperture therebetween becomes larger.

Coordinated motion of member 406 with member 408 is provided by a slave pulley system. Thus, pulleys 432, 433, 434, and 435 are rotatably attached to frame 422 by individual pulley supports 436. A belt 437 extends around pulleys 432 and 433 while a belt 438 extends around pulleys 434 and 435. As shown in the Figure, pulleys 432 and 434 lie substantially below shutter member 408 while pulleys 433 and 435 lie substantially below shutter members 406. Belt 437 is affixed to shutter member 408 along the outside edge at a belt attachment 440 and to shutter member 406 on its opposite side at an attachment 442. Belt 438 is connected along its outside edge to shutter member 408 at a belt attachment 444 (not shown) and to shutter member 406 at a belt attachment 446. Thus, movement of shutter member 408 towards shutter member 406 through the operation of motor 420 causes belt 437 to be pulled along at attachments 440 and 446. Since shutter member 406 is attached to belts 437 and 438 at attachments 442 and 446, shutter 406 will be dragged towards shutter member 408 by the rotation of belts 437 and 438 around pulleys 432 435. Similarly, when motor 420 is reversed so as to move shutter member 408 away from shutter member 406, belts 437 and 438 will be rotated by means of their attachment to shutter member 408 at attachment points 440 and 444, causing shutter member 406 to move outward by means of this attachment to belts 437 and 438 at attachment points 442 and 446. Thus, in this manner, both shutter pairs 402 and 404 may expand and contract the area therebetween so as to mask off any area of disinterest on the transparency being imaged. The masking mechanism allows any rectangular area of any size to be hidden from image recorder 204. Further, masker 218 is sufficiently constructed and disposed such that an area 14 inches by 17 inches will be unmasked at desired times so that an entire transparency can be imaged by recorder 204.

Figure 7:
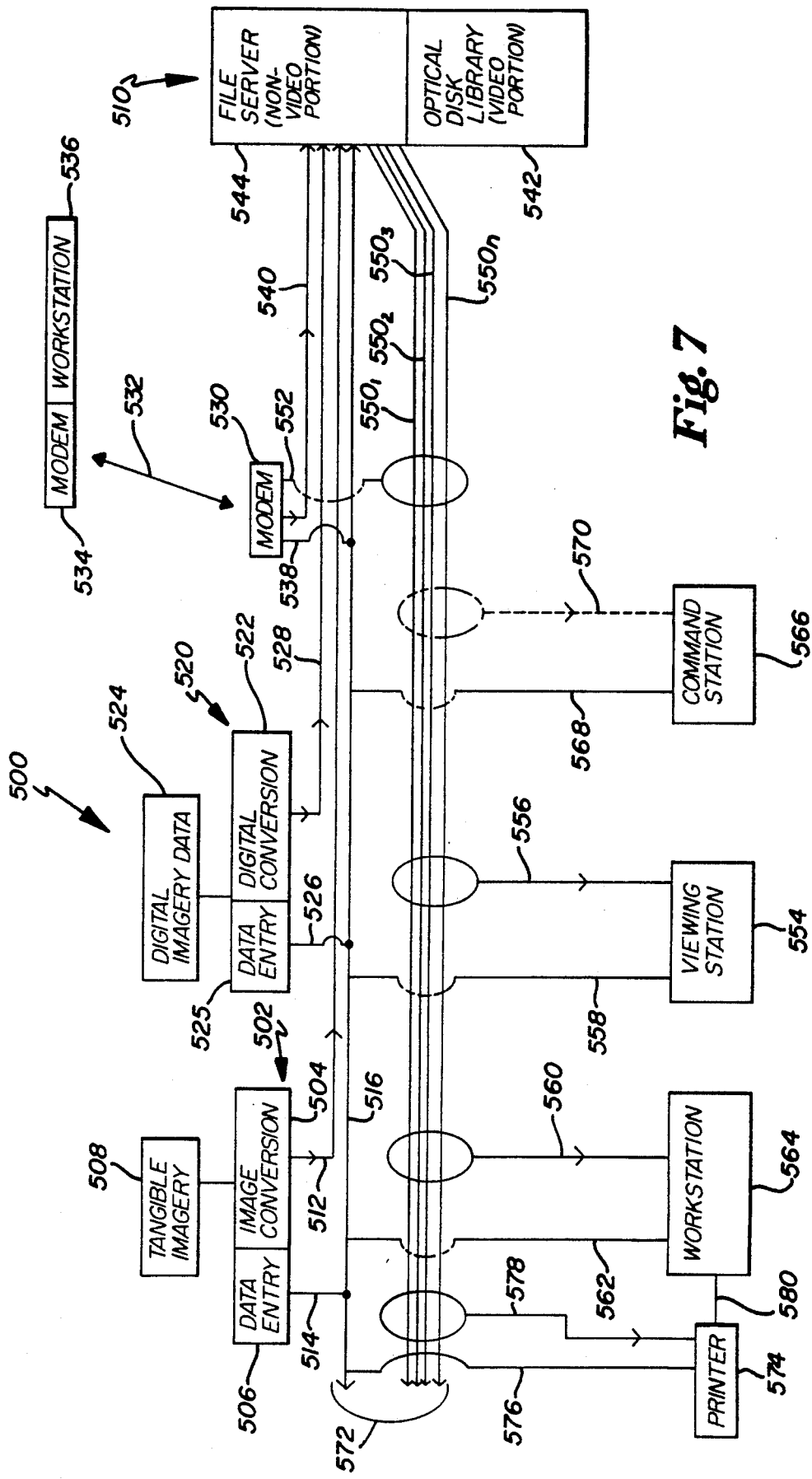
FIG. 7 depicts a system for integrating tangible and intangible images into a single system wherein the images are stored in an optical disc library.

FIG. 7 illustrates a representative integrated image storage and retrieval system 500 wherein imagery originally in tangible and electronic forms are combined in a single library capable of serving local and remote user of the image data. System 500 incorporates the speed of analogue formats with the flexibility provided by digital manipulation of data. System 500 includes an image conversion apparatus 502 comprising an image conversion station 504 and a data input station 506 that converts tangible imagery 508 into an analogue video signal for recording on a WORM (write once, read many) optical disc. Obviously, simple conversion of the tangible imagery 508 into an electronic signal is useless without the corresponding patient information. Therefore, the patient information may be inputted into the system by separate data entry station 506 operated by human personnel or may be input into the system by means such as bar codes placed on the imagery prior to its being recorded and read by a scanner during the image recording process. The video signals provided by image conversion station 504 are supplied to a library system 510 by means of a video input line 512 and the data is supplied to library system 510 by a data input line 514 connected to a data bus 516. Data such as patient information is recorded and stored digitally rather than in analogue format.

System 500 further comprises digital conversion apparatus 520 comprising a digital conversion station 522 that converts video data found in digital imagery 524 into an analogue format. Digital conversion apparatus 520 also includes a data entry station 525 for inputting data not already part of the digital imagery data 524. Non-video data is not converted to the analogue format, but remains in the digital format and is supplied over a data line 526 to data bus 516. The converted analogue signals are supplied to library system 510 over a video data line 528.

System 500 may further include a modem 530 useful in communicating with remote locations. Thus, modem 530 may be linked via communication means 532 to a remote modem 534 which in turn is connected to a remote workstation 536. Communication means 532 may include telephone lines, optical fibers, or radio communication. Modem 530 is connected to data bus 516 by means of a data line 538. In addition, modem 530 communicates with library system 510 by means of a video input line 540. This enables remote workstation 536 to input video data into library system 510.

Thus, library system 510 receives video input signals over video data lines 512, 528, and 540 and records the information transmitted thereto along those video data lines on an optical disc in an analogue format. Library system 510 includes a video portion 542 and a non-video portion 544 where all other information including patient information is digitally recorded and stored. Optical disc portion 542 may include a plurality of WORM recorder/players with the optical disc being stored in a jukebox or carousel type of apparatus.

A plurality of video output lines such as lines $550_1$, $550_2$, $550_3$ up to $550_n$, where n is equal to the number of recorder/players in optical disc portion 542 of library system 510, carry the analogue video data from library system 510 to users wishing to view the video information. Thus, video signals may be output from library system 510 over a video output line 550 and from there transmitted via a video data line 552 to modem 530 for transmission to remote workstation 536. Line 552 is capable of receiving signals over any of the video output lines 550. With the system shown, a consulting physician who is remotely located from the patient may receive current medical imagery almost instantaneously with its production, thus speeding evaluations of illnesses, reducing in-patient hospital costs, and reducing the risk of delayed evaluation to the patient.

The video information contained in the library system 510 may also be viewed locally. Thus, video output lines 550 may be connected to a viewing station 554 by means of a video line 556. Viewing station 554 may comprise simple monitors that receive the video signal and capture it for viewing by a physician. Non-video data related to the patient is provided to the viewing station 554 over a data line 558, which is connected to data bus 516. Data line 558 further allows an operator at viewing station 554 to communicate with library system 510 to select the images desired.

Library system 510 may also be connected by a video line 560 and data line 562 to a workstation 564. At workstation 564 the incoming analogue video signal may be converted to a digital signal and thereby manipulated and enhanced as desired to emphasize or de-emphasize certain aspects of the incoming video signal. By converting the signal to a digital format, the workstation could capture a particular image for continuous display, thereby freeing up an optical disc player and a video output line for use by other viewing or workstations. Analogue display requires that a particular optical disc be dedicated to reproducing an image for a particular station since the disc must provide a complete image to the station thirty times per second. Thus, again the digital/analogue marriage provides advantages that neither system alone has while eliminating disadvantages of each.

System 500 may further include a command station 566 connected to data bus 516 by a non-video data line 568 and, if desired, a video data line 570. Command station 566 would typically include a computer with keyboard and monitor that would allow control of the workstation and viewing stations for viewing of particular images and would enable those stations to be preloaded by technicians for ready reference by a physician when needed. If desired a printer 574 may be connected to data bus 516 by a data line 576, to video lines 550 by a video data line 578 and to workstation 564 by a line 580. Printer 574 can thus print images directly from the library system 510 or enhanced images from workstation 564. Line 516 and 550 form a bus network 572 to which additional workstations, video stations and modems may be connected.

The system 500 provides a prompt response time due to the rapidity with which the analogue video signals may be transmitted over the video lines 550. Just as with a television signal being transmitted by a local cable television station, as many as thirty complete images may be transmitted over lines 550 each second compared to the 15 to 90 seconds that may be necessary to transmit a single digital image. Thus, the analogue recording of the present invention results in a sizeable savings of time that would be otherwise lost by technicians and doctors waiting for the arrival of an image in a digital format from library system 510. Image system 500 provides significant archiving capability due to the speed of the analogue format. Thus hospitals, if desired, may transfer all hard copy medical imagery that they presently have on hand into library 510. Additionally, medical images may be produced and stored in library 510 in real time. Thus, a consulting physician may be able to observe a medical image almost simultaneously with its production even though he may be located in a different city by means of transmission means 532. Yet another advantage of the present system is that it allows time and motion studies to be accomplished at viewing station 554 or workstation 564. Because the analogue video signal can transmit thirty images per second over video lines 550, the study of a beating heart, for example, can be made at the stations. Finally, the system offers the capability of adding audio signals to accompany the video signals on video input lines 512, 528 and 540 and video output lines 550. With such a system then, the treating or consulting physician could make an evaluation for example, from both the sound and imagery of a beating heart.

The speed offered by system 500 due to its advantageous combination of digital and analogue formats also provides unique education and training opportunities. Because access to library system 510 could be virtually unlimited, workstations and viewing stations dedicated to training older physicians or new medical students could be emplaced either at a hospital, a medical school, or an office remote from the library system. Optical discs having information dedicated to a teaching or training function could be included in library system 510 for viewing by medical practitioners.

Thus, system 500 provides a complete, integrated system for the recording and reproduction of all currently available medical imagery. This system is made possible by image conversion station 504 and its unique light source as described with relation to FIGS. 1 and 2.

Figure 9:
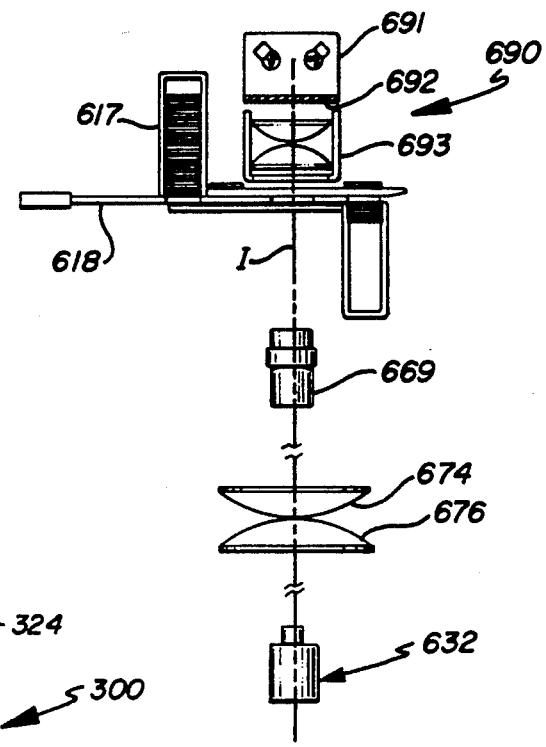
FIG. 9 shows in a schematic view the optical bench of FIG. 8 and illustrates an alternative placement of the light source on the bench.
Figure 8:
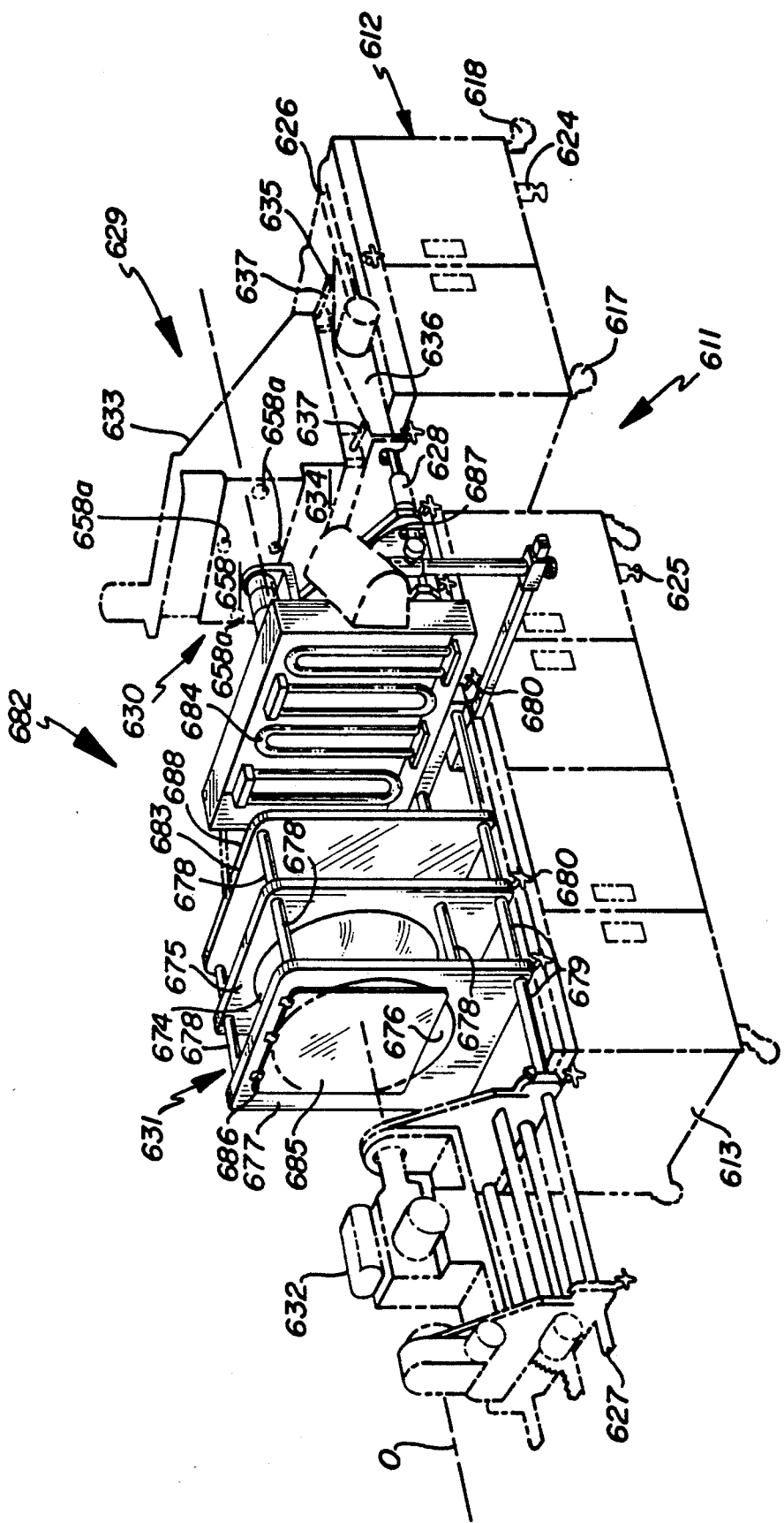
FIG. 8 illustrates an optical bench incorporating a light source in accord with the optical principles shown in FIGS. 1 and 2 wherein the light source comprises a modular attachment.

FIGS. 8 and 9 represent other apparatus where the novel light source described in FIGS. 1 and 2 may be utilized to produce high quality images from a tangible image. The apparatus illustrated in FIGS. 8 and 9 is described in great detail in U.S. Pat. No. 4,757,374, to Ramsay et al. assigned to the same assignee as the present invention. The disclosure of U.S. Pat. No. 4,757,374 is hereby incorporated by reference. The referenced patent described and claimed a novel modular optical system. The optical system will be generally described here. Reference should be made to U.S. Pat. No. 4,757,374 for a detailed description.

The modular optical system includes a modular base 611, which is comprised of a base unit cabinet 612 and a base unit cabinet 613. It will be appreciated that additional cabinets may also be used when desired. The cabinet 612 is supported on a pair of rollers 617 and a pair of caster rollers 618 to facilitate movement of the cabinet from one location to another.

The cabinet 612 is provided with a pair of vertically adjustable legs 624, while the cabinet 613 is provided with pairs of vertically adjustable legs 625. These vertically adjustable legs permit the cabinet to be maintained in a stationary position.

The cabinet 612 is provided with a pair of elongate guide rods or tracks 626. The cabinet 613 is also provided with a pair of elongate substantially parallel rods or tracks 627, which are secured thereto and spaced slightly above the top wall thereof. The rods 626 are detachably coupled to the rods 627 by a suitable sleeve coupling 628 to interconnect the base unit cabinet 612 to the base unit cabinet 613.

The modular optical system includes an image support module 629, a projection lens module 630, a condenser lens module 631, and an image recorder module 632. It will be noted that the projection lens module is positioned between the image support module and the condenser lens module. It will further be noted that the condenser lens module is positioned between the image recorder module and the image projection module. Each of these modules are positioned along an optical axis O. The U.S. Pat. No. 4,757,374 describes the structure and method for adapting the position of these components with respect to each other.

Referring again to FIG. 8, it will be seen that the image support module 629 is mounted on the base unit cabinet 612, while the projection lens module 630, plano-convex condenser lens module 631, and image recorder module 632 are all mounted on the base unit cabinet 613. It will be seen that the image support module 629 includes a base frame 633, which is of a generally rectangular configuration and includes a front frame element 634, and a rear frame element 635, which are rigidly interconnected by a pair of substantially parallel side frame elements 636. A pair of elongate transversely extending substantially parallel guide rods 637 extend between and are rigidly connected to the side frame elements of the base frame 633.

The image support frame 658 is provided with a plurality of forwardly projecting pin elements 658a which permit ready mounting and ready removal of the image transport system thereon. The image transport system may be a film advance device, a slide transparency device, a 35 mm projector or any image transport system which may be mounted on the image support frame 658.

It will be seen that the condenser lens module 631 is comprised of a pair of plano-convex lenses which are arranged in pre-determined spaced apart relation with respect to each other. The condenser lens module includes a plano-convex lens 674 which is mounted in a plate 675. The condensing lens module also includes the plano-convex lens 676 which is mounted in a mounting plate 677. The mounting plates 675 and 677 are rigidly interconnected together by suitable tie rods 678.

It will be noted that the lower edge portion of the mounting plates 675 and 677 each have a pair of recesses 679 therein adjacent the corners thereof for accommodating the rods or tracks 627 therein. Each plate also has a pair of threaded recesses which threadedly receive the clamping bolts 680 therein. The clamping bolts permit the condenser lens assembly to be clamped in fixed relation at a selected position on the rods 627. The condenser lenses produce an aerial image when an image is projected through the condenser lenses.

Referring now to FIG. 9, it will be seen that one mode of use of the modular optical system is diagrammatically illustrated. It will be seen that the original comprises a plurality of slides which are positioned within a slide feed magazine 617. The slides are advanced in a lateral direction by slide advance pneumatic cylinder and piston unit 618. It will be seen that, when the piston rod of the piston and cylinder unit 618 is extended, each slide is successively moved into position so that it is centered on the optical axis I. It will again be noted that the image will be projected by the zoom projection lens 669 and transmitted through the condenser lenses 674, 676 to create an enlarged aerial image of the portion of the transparency projected by the projection zoom lens. The enlarged aerial image is transferred to the zoom optics of the image recorder 632 which, as shown in FIG. 8, comprises either a video or film recorder. It is pointed out that the film driving mechanism for moving the film strip and the mechanism for supporting and advancing the slide transparencies will be mounted upon the pins 658a on the image support module. This permits the particular mechanism for supporting the originals to be readily mounted or removed from the image support module. Both the drive mechanism for the film strip and the slide advance mechanism will move each frame of the film strip or each slide transparency into centered relation with respect to the optical axis.

The novel light system described is useful in relation to FIGS. 8 and 9 for providing a horizontal bench arrangement for electronically imaging transparencies of all sizes, from a large medical X-ray to a motion picture type of image. Thus, as shown in FIG. 8, the light source illustrated in FIGS. 1 and 2 may comprise a modular unit 682 including a diffuser 683 and a plurality of elongate light generators 684. Modular light source 682 may be attached to rod 627 by clamping bolts 680 in the same manner as condenser lens module 631 is attached thereto. Thus, modular light source unit 682 will also be slidably mounted on base unit cabinet 613 and can therefore be adjusted in its relation to modular condenser unit 631 such that diffuser 683 is spaced at least one focal length away from condenser 631. With the use of modular light source 682, large transparencies such as medical X-rays or a large transparency 685 may be suspended in a substantially abutting relationship with the light exiting side of condenser 631 by any known means such as medical lightbox clips 686. A masking mechanism of the type shown in FIG. 5 preferably will be utilized to prevent the transmission of unwanted light to image recorder module 632. Though not preferable, rather than using elongate light generators 684, a plurality of light generators 687, shown in FIG. 8 in phantom, may be used to supply the illumination to backlight transparency 685. Light generators 687 are slidably mounted on rods 627 and are angularly arrayed with respect to the planar surface presented by diffuser 683. Thus, light generators 687 are spaced from diffuser 683 and are positioned such that the light emitted therefrom is directed at approximately a 45 degree angle to the surface of diffuser 683. While one such light generator are shown in the Figure, more could be appropriately used to provide a substantially even illumination across the light entrance surface 688 of diffuser 683.

Referring now to FIG. 9 which, as noted earlier, represents a schematic diagram of the apparatus shown in FIG. 8, the use of a novel light source described herein during the reproduction and recordation of small transparencies such as slides, 35 mm film and microfiche will be described. It should be noted that with transparencies of such size, the evenness of the irradiation passing through the transparency is equally critical to faithfully reproducing the details shown on the transparency. As the size of the transparency diminishes, the detail stored thereon is increasingly stored in a smaller area. In order to clearly discriminate between the details recorded on the transparency then, a light source providing a substantially equal irradiance at each point thereof becomes critical. Thus, as shown in FIG. 9, a modular light source 690 comprising light generator 691, diffuser 692, and condenser 693 is used to provide the lighting of the slide. Again, diffuser 692 should be no closer to condenser lens unit 693 than the focal point thereof. Modular light source 690 should be placed relative to the transparency such that the transparency lies as close as possible to the light exiting side of condenser 693. Of course, when used with transparencies of a size similar to that of a 35 mm film or microfiche, modular light source 690 can be substantially reduced in size.

Having thus described the present invention, numerous other modifications, alterations, or substitutions may now suggest themselves to those skilled in the art, all of which are within the spirit and scope of the present invention. Among them are that the present apparatus is useful in producing recordings of any kind of image contained in a transparent medium. Thus, the present apparatus would lend itself to electronic reproduction and recording of aerial photographs, or any other kind of image where a high quality reproduction is desired. It is therefore intended that the present invention be limited only by the scope of the attached claims below.

We claim:

1. Apparatus for converting primary visual data in a first medium into secondary visual data in a second medium, said apparatus having an optical axis O and comprising:

a source of electromagnetic radiation positioned on said axis and illuminating said primary visual data, wherein said source includes: a generator of said radiation; and a diffuser;

a condenser positioned on said optical axis and having a focal length f, said condenser for gathering and focusing said radiation and for directing said focussed radiation through said visual data to produce a focused image of said primary visual data, said diffuser being disposed between said generator and said condenser and spaced apart from said condenser, said condenser being disposed between said source and said first medium;

means for disposing said first medium containing said primary visual data closely adjacent to said condenser; and an image recorder positioned on said optical axis for capturing said focused image and for recording said focused image in said second medium.

wherein said diffuser is disposed at a distance d from said condenser, where $$d \geq f.$$

2. The apparatus of claim 1 wherein said condenser comprises first and second plano-convex lenses, said first lens being disposed between said diffuser and said second lens.

3. The apparatus of claim 2 wherein the convex sides of said first and second lenses face each other.

4. The apparatus of claim 3 wherein said means for disposing disposes said first medium in close proximity to the planar side of said second lens between said condenser and said image recorder.

5. The apparatus of claim 4 wherein said generator is a non-incandescent light generator.

6. The apparatus of claim 1 wherein said visual data comprises X-ray data and said first medium comprises photographic negative images.

7. The apparatus of claim 6 wherein said second medium comprises an analogue recording of said visual data on an optical disc.

8. Apparatus for reproducing and recording an image original from a tangible medium into a different medium, said apparatus comprising:

means for producing at each point of a first image plane a substantially equal irradiance, means for supporting said image original at a second image plane; and an image recorder spaced from said image original, said image recorder having a recording surface upon which the image original is recorded, said recording surface being substantially co-planar with said first image plane;

wherein said means for producing a substantially equal irradiance comprises:

a source of electromagnetic radiation; and a condenser having an optical axis O and a focal length f, said condenser being provided for gathering and focusing said radiation, wherein said second image plane is substantially transverse to said optical axis O;

said condenser is disposed between said source and said second image plane; and said source is spaced from said condenser a distance d such that $$d \geq f.$$

9. The apparatus of claim 8 wherein said source comprises:

a generator of said radiation; and a diffuser disposed between said generator and said condenser, said diffuser located at said distance d.

10. The apparatus of claim 9 wherein said condenser comprises:

first and second plano-convex lenses, wherein the convex sides of said lenses face each other.

11. The apparatus of claim 8 and further including:

means for masking selected portions of said image original, wherein the unmasked portion of said image original is centered on said optical axis and comprises an area of interest, said means for masking being disposed between said first medium and said condenser and being constructed and arranged to substantially prevent excess light from passing through said selected portions of said image original into said image recorder and to substantially prevent the excess light from obscuring the contrast in said area of interest.

12. The apparatus of claim 11 wherein said means for masking comprises:

a first shutter comprising:

a first pair of parallel spaced apart rails mounting a first pair of mutually movable panels, said panels of said first pair being movable in opposite directions so as to expand or contract the unmasked portion of said image original, said first shutter further including actuation means for selectively moving said first pair of panels; and a second shutter comprising:

a second pair of parallel spaced apart rails mounting a second pair of mutually moveable panels, said panels of said second pair being movable in opposite directions so as to expand or contract the unmasked portion of said image original, said second shutter further including actuation means for selectively moving said second pair of panels; and means for supporting said means for masking between said condenser and said means for transporting.

13. Apparatus for reproducing and recording an image original from a tangible medium into a different medium, said apparatus comprising:

means for producing at each point of a first image plane a substantially equal irradiance, means for supporting said image original at a second image plane; and an image recorder spaced from said image original, said image recorder having a recording surface upon which the image original is recorded, said recording surface being substantially co-planar with said first image plane;

wherein said apparatus further includes:

means for masking selected portions of said image original, wherein the unmasked portion of said image original is centered on said optical axis and comprises an area of interest, said means for masking being disposed between said first medium and said condenser and being constructed and arranged to substantially prevent excess light from passing through said selected portions of said image original into said image recorder and to substantially prevent the excess light from obscuring the contrast in said area of interest.

14. The apparatus of claim 13 wherein said means for masking comprises:
   a first shutter comprising:
      a first pair of parallel spaced apart rails mounting a first pair of mutually movable panels, said panels of said first pair being movable in opposite directions so as to expand or contract the unmasked portion of said image original, said first shutter further including actuation means for selectively moving said first pair of panels; and
   a second shutter comprising:
      a second pair of parallel spaced apart rails mounting a second pair of mutually moveable panels, said panels of said second pair being movable in opposite directions so as to expand or contract the unmasked portion of said image original, said second shutter further including actuation means for selectively moving said second pair of panels; and
   means for supporting said means for masking between said condenser and said means for transporting.

15. An optical bench for transferring primary visual data contained in a first medium into secondary visual data in a second medium, said bench comprising a plurality of modules disposed along an optical axis O and including:
   a modular support means;
   a source module for electromagnetic radiation, said source module including at least one non-incandescent generator of said radiation and a diffuser;
   an image recorder module spaced from said source module and positioned on said optical axis, means adjustably and detachably mounting said image recorder module on said support means, said image recorder module having an imaging plane upon which the visual data is to be recorded;
   a condenser module disposed between said source module and said image recorder module and defining a focal point on the optical axis at said imaging plane of said image recorder module and including means mounting said condenser module to said support means; and
   an image support module for supporting said visual data in said first medium, said support module disposed between said condenser module and said image recorder module and closely adjacent to said condenser module, said image support module including means adjustably and detachably mounting said image support module on said support means,
wherein said condenser module gathers and focusses said radiation, has a focal length f, and is spaced from said source module a distance d such that $$d \geq f.$$

16. The optical bench of claim 15 wherein said condenser module further includes first and second plano-convex lenses.

17. The optical bench of claim 16 wherein:
said image recorder module comprises a frame shiftably mounted on said support means, an image recorder having a recording surface and being shiftably mounted on said support frame, and means connected with said image recorder for rotating the latter and the recording surface about an axis coextensive with the optical axis in response to a control signal, and wherein said optical bench further includes computer control means producing said control signal to provide correct orientation of the image on the recording surface.

18. The optical bench of claim 17 wherein:
said means for rotating said image recorder and said recorder surface comprises a stepper motor.

19. The optical bench of claim 16 wherein:
said modular support means comprises a pair of separable base support units, each base support unit having a pair of elongate, spaced apart, substantially parallel rods thereon, said image support module being shiftably mounted on the rods of one of said base units for movement in a direction parallel to said optical axis and said projection lens module, and said image recorder module being shiftably mounted on the rods of the other base support unit, means releasably coupling each rod on one base support unit in aligned, secure relation with a rod on the other base support unit, said coupling means being readily detachable from said rods to permit said base support units to be separated from each other.

20. The optical bench of claim 16 wherein said first and second plano-convex lenses are positioned with the convex sides of said lenses facing each other, and wherein said image support module is disposed such that said first medium is substantially flush with the planar side of said second lens.

21. The optical bench of claim 15 wherein said visual data comprises X-ray data and said first medium comprises negative transparencies.

22. The optical bench of claim 21 wherein said second medium is an optical disc.

23. The optical bench of claim 15 and further including:
   a second condenser module having a second condenser module focal length $f_2$, said second condenser module being disposed between said support module and said image recorder module.

24. A system for providing a substantially equal irradiance at each point of a preselected area, said system comprising:
   a source of electromagnetic radiation; and
   a condenser having an optical axis O and a focal length f, said condenser being provided for gathering and focusing said radiation, said condenser comprising first and second plano-convex lenses, wherein the convex side of said lenses face each other, said first lens being disposed between said second lens and said source;
wherein said preselected planar area is substantially transverse to said optical axis O and is substantially adjacent to and parallel with the planar face of said second lens; said condenser is disposed between said source and said preselected planar area; and said source is spaced from said condenser a distance d such that $$d \geq f.$$

25. The system of claim 24 wherein said source comprises:

at least one generator of said radiation; and a diffuser disposed between said generator and said condenser, said diffuser located at said distance d.

26. The system of claim 25 wherein said radiation is created substantially without incandescence.

27. The system of claim 24 wherein said source comprises:

at least one generator of said radiation, said radiation being created substantially without incandescence; and a diffuser disposed between said generator and said condenser, said diffuser being located at said distance d.

28. The system of claim 27 wherein said pre-selected area is substantially equal in size to planar face of planar second lens.

29. The system of claim 27 wherein said pre-selected area is equal to at least fourteen inches by at least seventeen inches.

30. Apparatus for reproducing and recording an image original from a tangible medium into a different medium, said apparatus comprising:

means for producing at each point of a first image plane a substantially equal irradiance;

means for supporting said image original at a second image plane; and an image recorder spaced from said image original, said image recorder having a recording surface upon which the image original is recorded, said recording surface being substantially co-planar with said first image plane;

wherein said means for producing a substantially equal irradiance comprises:

a condenser having an optical axis O and a focal length f; and a light source, said source comprising:

a plurality of non-incandescent, elongated light generators, said generators, arranged substantially side-by-side in a common plane to form an array, each of said generators generating light along substantially the entire length thereof; and a diffuser disposed opposite the center portions of said array so as to substantially equalize the irradiance at each point in a second plane parallel to said common plane but spaced thereabove along said optical axis O; and wherein said condenser is provided for gathering and focusing said light produced by said light generators;

said source is spaced from said condenser;

said second image plane is substantially transfers to said optical axis O; and said condenser is disposed between said source and said second image plane.

31. The apparatus of claim 30 wherein said source further comprises:

a second, substantially planar diffuser disposed co-planar with said second plane and spaced from said first diffuser, said second diffuser being of sufficient dimensional size to cover said array.

32. The apparatus of claim 31 wherein said source further includes first and second non-incandescent, elongated light generators, said first and second generators being disposed in a third plane disposed parallel to and between said common plane and said second plane.

* * * * *

UNITED STATES PATENT AND TRADEMARK OFFICE
CERTIFICATE OF CORRECTION

PATENT NO. : 5,321,681
DATED : June 14, 1994
INVENTOR(S) : Eugene B. Ramsay, et al.

It is certified that error appears in the above-indentified patent and that said Letters Patent is hereby corrected as shown below:

IN THE CLAIMS:

Col. 23, line 16, claim 28, after the words "equal in size to" insert the word --said--.

Col. 23, line 16, claim 28, after the words "face of" delete "planar" and substitute --said--therefor.

Col. 24, line 19, claim 30, delete "transfers" and substitute --transverse--therefor.

Signed and Sealed this

Twenty-seventh Day of June, 1995

Attest:

BRUCE LEHMAN

Attesting Officer      *Commissioner of Patents and Trademarks*